Figure 1:
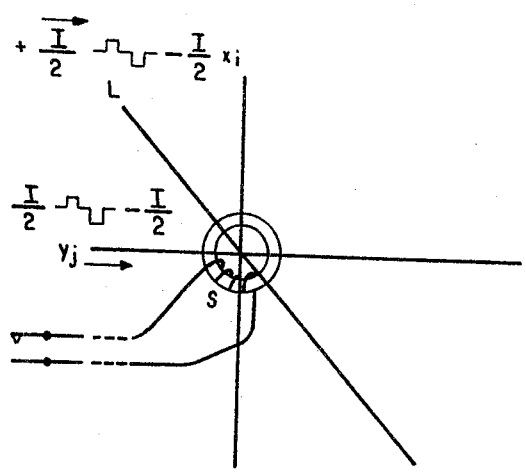

Aug. 30, 1966  JEAN-FRANCOIS LEDOUX ETAL  3,270,322
CORE MATRIX SYSTEM FOR MONITORING A PLURALITY OF CONTACTS
Filed Jan. 22, 1963  5 Sheets-Sheet 1

$\Delta B\,II < \Delta B\,I$
$\Delta B\,III > \Delta B\,I$

INVENTORS
JEAN-FRANCOIS LEDOUX
ANDRÉ FEYZEAU

BY: Paul M. Craig, Jr.

ATTORNEY

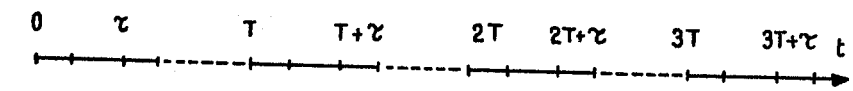
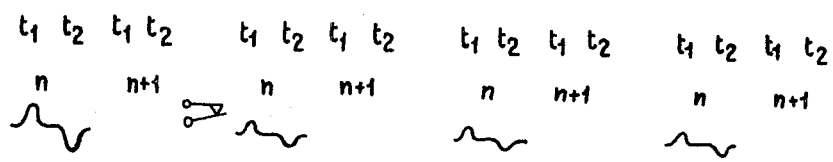
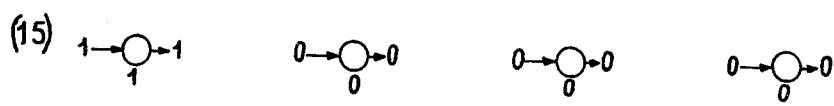
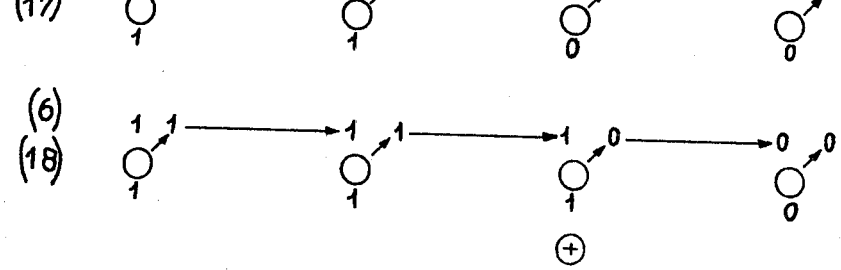
*Fig. 6*

United States Patent Office 3,270,322
Patented August 30, 1966

3,270,322
CORE MATRIX SYSTEM FOR MONITORING A PLURALITY OF CONTACTS
Jean-Francois Ledoux, Paris, and André Feyzeau, St.-Maur, France, assignors to CIT Compagnie Industrielle des Telecommunications, Paris, France
Filed Jan. 22, 1963, Ser. No. 253,214
2 Claims. (Cl. 340—166)

The invention concerns a device which is intended for monitoring a system for the automatic control of a complex assembly. In such a complex assembly comprising a large number of co-operating parts and subjected to many variables, for example a central heat-engine power plant for the production of electricity, there exist inter alia mechanisms which control either the flow of fluids in the heat cycle (valves) or the passage of electric current (switches and isolators), as also supervisory members (pick-up members) having a two-step action in relation to a predetermined reference value (pressure responsive contacts). It is therefore a question of control or supervisory members which can have two states of operation, i.e. on or off.

On the other hand, the member which effects the automatic control of the complex assembly, for example a numerical electronic computer, emits logical decisions as a function of numerous data, including more especially the changes of state of the aforesaid circuit-breaking or supervisory members.

On the other hand, it is assumed that items of information regarding the state of operation of the circuit-breaking members are transmitted to the control member by relays, one relay having an off-normal contact being allocated to each member and controlled in synchronism therewith.

The repetition of the state of the member of the thermal equipment by a relay has the advantage of completely isolating the mass of the electronic equipment from the mass of the thermal equipment.

It is standard practice to associate with each relay a toroidal magnetic core having a rectangular hysteresis loop, and the address of each relay is represented by electrical phenomena related to the changeover of the magnetisation of the said magnetic cores arranged in the form of a matrix. The invention therefore relates more especially to the signalling of the change of state of one or more relays, out of several thousands, the address of the relay or relays which changes or change state being indicated by electrical phenomena related to the operation of a toroidal magnetic core having a rectangular hysteresis loop associated with the said relay and taken from a matrix assembly.

The problem to which the invention affords an original advantageous solution consists on the one hand in marking the changes of state on an address matrix comprising magnetic cores, and on the other hand in locating them, each of the said changes of state being signalled to a computer with the address of the corresponding relay.

This problem therefore has two different but closely related aspects, and the device by which it is resolved comprises a unit whose design and operation are characteristic of a unitary invention.

This device comprises essentially the following elements:

(1) A first matrix R comprising magnetic toroidal cores having a rectangular hysteresis loop, each of which cores comprises, in addition to the usual scrutinising and reading wires, a winding which is, in accordance with the invention, directly connected to the points of one of the contacts, on the state of which it is desired to keep a check.

(2) A second toroidal core matrix $M_1$ and a third toroidal core matrix $M_2$, these two matrices being provided on the one hand with scrutinising wires connected in series, line by line and column by column, in the case of the three matrices, and on the other hand with a reading wire and an inhibitory wire.

(3) Copying bistable flip-flops, of which two are allocated to the matrix R, one to the matrix $M_1$ and one to the matrix $M_2$.

(4) A first logical circuit $L_1$ and a second logical circuit $L_2$, which receive the output signals of the flip-flops and, where necessary, the complements to the said signals.

The device also comprises auxiliary members, of which the operation will be explained in the detailed description which will be given in the following with reference to the drawings.

The principle of the invention consists in utilising the modifications of change-over characteristics of the toroidal cores of the matrix R under the effect of the closing or opening of the contacts for registering in the stores $M_1$ and $M_2$ by means of the logical circuit $L_1$ in the course of recurrent explorations, signals such that if the state of a contact changes this change is signalled by the logical circuit $L_2$, after it has been observed in the course of two successive explorations, the signal emitted by the logical circuit $L_2$ having the effect of signalling to the computer "on" or "off," as the case may be, as also of producing the registration in the store of the computer of the address of the contact whose state has changed.

The matrix comprising magnetic cores connected to the contact on which a check is to be kept is explored by recurrent scrutinies. Each elemental scrutiny lasts a certain time, which will be called the scrutinising period, and the scrutiny of all the cores of the matrix in succession will be called the scrutinising cycle. It may be indicated that, in one example of the application of the invention, the number of contacts on which a check is to be kept was 3,000, the scrutinising period was 20 microseconds and the cycle 60 milliseconds. The arrangment and utilisation of the cores will be explained with reference to FIGURES 1, 2 and 3.

Figure 2:
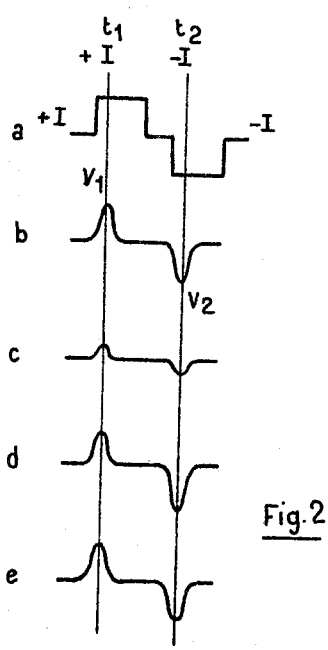
Figure 3:
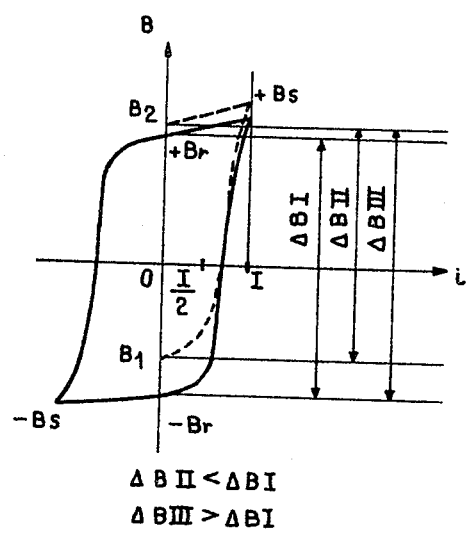

FIGURE 1 represents a core provided with various wires and a winding such as is employed in the device according to the invention. FIGURE 2 shows the current pulses applied to one of the cores in the course of a scrutinising period, and corresponding voltages, depending upon the various cases of operation. FIGURE 3 shows a quasi-rectangular hysteresis loop of one of the cores employed.

In accordance with the current method of use of magnetic core matrices, each core is traversed by a vertical wire of rank $x_i$, by a horizontal wire of rank $y_j$, and by a reading wire L common to all the cores of the matrix. The reading wire L is looped on a reading impedance $Z_L$ (not shown). The method of selecting the core $(i\ j)$ consists in simultaneously applying to the wire $x_i$ on the one hand and to the wire $y_j$ on the other hand two equal currents $I/2$ (FIGURE 3), of which the sum constitutes the triggering current I. The single core ($i\ j$) which has been selected is thus triggered.

The scrutinising pulse is applied twice in succession, with opposite polarities, with an interval of a few microseconds, in the course of one period, at the times $t_1$ and $t_2$. These two pulses are diagrammatically indicated in the diagram of FIGURE 2. Under these conditions, it will be seen from FIGURE 3 that the point representing the magnetic state of the core, originally in the position $-B_r$ (which is taken conventionally as representing the numerical value 1) changes to $+B_s$ at the time $t_1$, thereafter passes through $+B_r$ (zero state), and then through $-B_s$ at the time $t_2$, and returns to $-B_r$.

As well as being provided with the aforesaid three wires, each core is provided with a winding S of a few turns, as shown in FIGURE 1. According to the invention, the ends of this winding are connected to the two points of the contact whose address ($i\ j$) is identical to that of the core. The connection between the core and the corresponding relay will be effected by means of a coaxial cable in order to avoid parasitic couplings and to minimise the inductive load. The length of the cable will in practice be limited to a few metres.

When the contact is open, the core is loaded only by the capacitance of the coaxial cable. In FIGURE 3, which shows a quasi-rectangular hysteresis loop of one of the cores employed in the device according to the invention, it will be seen that if the core is originally in the state $-B_r$, the current pulse I of the time $t_1$ causes it to change over into the position $+B_r$. The pulse of the current $-I$ of the time $t_2$ then causes it to return to the position $-B_r$. There are thus set up at the terminals of the reading impedance $Z_L$ two voltage pulses of opposite polarities. These pulses are represented by the diagram $b$ of FIGURE 2.

On the other hand, when the contact ($i\ j$) is closed, a considerable load is set up at the core ($i\ j$). In order to evaluate the effect produced by this load on the voltage which is set up across the terminals of the impedance $Z_L$, it is necessary to consider, in FIGURE 1, the wire L and the winding S as the primary and secondary windings respectively of a transformer. Assuming that the winding S comprises four turns, which is the maximum value which is possible in practice with the cores employed, an impedance transformation ratio of 16 is obtained for the transformer.

The ohmic resistance of the connecting circuit of the relay and of the closed contact reaches 0.5 ohm at most. With regard to the reactive part of the impedance of the circuit of the relay in the operating position (coaxial cable short-circuited), there may be allocated thereto a maximum impedance value of 2 microhenries with an applied frequency of the order of 250 kc./s., as a broad approximation, in the case of two pulses of opposite polarities which have a total duration of 4 microseconds. There is thus obtained an inductive impedance of the order of 3 ohms, in comparison with which the ohmic resistance is negligible.

This impedance of 3 ohms is seen from the primary winding with the value $3/16$ ohm, i.e. about 0.2 ohm. The loop impedance $Z_L$ of the reading wire L being of the order of 100 ohms, it will be seen that the closing of the contact ($i\ j$) constitutes a considerable load on the core ($i\ j$). The effect of this load is to induce demagnetising ampere-turns in the core at the instant when its magnetic triggering commences. This results in a weaker net magnetising current, and consequently a longer magnetic triggering time since, as is known, the triggering is more rapid in proportion as the magnetising current is more intense. The pulses applied to the core are too short to produce a complete triggering under these conditions. The scrutinising current pulses $+I$ and $-I$ produce small cycles for which the remanence values are very much lower than $+B_r$ and $-B_r$ respectively (FIGURE 3). Consequently, the voltage pulses $V_1$ and $V_2$ obtained at the reading impedance in the case of a closed contact are smaller than the pulses obtained in the case of an open contact. They are less than half the latter. They have been represented in the diagram C of FIGURE 2. After a number of scrutinies with the contact in the closed position, the remanent magnetisation point is stabilised at $B_1$ in FIGURE 3. When there is only a very small number of closed contacts, the pulse obtained has an amplitude of 10 to 15 units, the value 100 being arbitrarily attributed to the pulse corresponding to established operation with the contact open. However, when the number of closed contacts is appreciable, and if their distribution is as unfavourable as possible, the systematic compensation between the semi-selection pulses at the reading wire which, as is known, is effected in principle by an appropriate arrangement of the cores in the matrix and an adequate stranding of the reading wire—both well known in the art—is disturbed, semi-selection pulses are set up, and in the most unfavourable case the pulses occurring with the state of operation established when the contact is closed will have an amplitude of about 45 units.

The device for the detection of closed contacts according to the invention is much simpler than the known so-called "inhibitory" devices, in which there is introduced into the core through the closed contact a gauged current intended to prevent the occurrence of pulses produced when the contact is open. The polarity of the scrutinising currents being reversed between the various parts of the matrix in order to compensate for the parasitic effects, the polarity of the inhibitory current would also have to be changed. The apparatus is therefore much simpler and is easier to assemble in the device according to the invention.

At the first scrutiny which follows the opening of the contact, the current pulse $+I$ at the time $t_1$ therefore finds the core in the state corresponding to the point $B_1$. The first hysteresis loop which is then traced (represented by a chain line in FIGURE 3) then brings the point of positive remanence to $B_2$, which is slightly above $+B_3$. The current pulse $-I$ of the time $t_2$ reduces the point of negative remanence to the immediate neighbourhood of the point $-B_r$. It will be seen in FIGURE 3 that the change of induction ($B_2-B_1$) is distinctly smaller than the variation from $+B_r$ to $-B_r$ under permanent operating conditions and that the change $B_2-(-B_r)$ is slightly larger. This brings about the following result, which is regularly obtained and is completely reproducible: the first pulse $V_1$ after the opening of the contact (diagram $d$ of FIGURE 2) is distinctly smaller than the pulse obtained in the permanent open state. On the other hand, the pulse $V_2$ is slightly larger. Starting from the following scrutiny (diagram $e$), there are found two pulses of equal amplitude, as in diagram $a$.

If the value 100 is arbitrarily attributed to the pulses $V_1$ and $V_2$ under established open-contact conditions (line $a$ or $e$), the first pulse $V_1$ after the opening of the contact will have an amplitude of the order of 85. The second pulse $V_2$ will have an amplitude of about 105.

Having regard to the dispersion between the magnetic characteristics, and taking into account the changes experimentally observed in the thresholds electrically supplying the discrimination "0," "1," the difference between $(V_1)_{open}=85$ and $(V_1)_{closed}=45$ is regarded as insufficient to ensure with absolute certainty the identification of an open contact at the first scrutiny which follows the opening. On the other hand, the pulse $V_2$ which follows the opening has an amplitude of 105 and therefore affords every guarantee of identification as opposed to the closed-contact pulse, which has an amplitude of 45.

One of the features of the invention resides in the use of the pulse $V_2$ as a "reading pulse" and not the pulse $V_1$.

In order to detect the difference in the state of a relay, which occurs between two scrutinies, it is known to store the state which has been detected by one scrutiny and to compare it, during the succeeding scrutiny, with the state which has just been detected. Therefore, in this case, there is a first matrix assembly or "table" R which indicates the state of each contact at the time of the scrutiny, located by its address, and a second matrix or "store" M, into which there is transferred the state of the table observed in order to detect any changes and to derive the necessary actions therefrom. For example, if it is assumed by convention that the state of triggering corresponding to an open contact is denoted by 1, and the state of triggering corresponding to a closed contact is denoted by 0, this method consists in writing at the address under consideration:

Table: 1    Store: 1

If the contact closes and remains closed, and 0 is written in the table:

R _____ M
0 _____ 1 whereafter the 0 will be transferred into the store and we shall have:

R _____ M
0 _____ 0

Conversely, if the contact opens, the preceding state (0–0) corresponding to the closed contact will give way to a state (1–0) and then to (1–1).

The change of state in the open-closed direction is represented, in the case referred to, by 0 1 and the change of state in the closed-open direction is represented by 1 0. It is therefore either the state 0 1 or the state 1 0 which triggers the action of the aforesaid computer.

However, such a method, which is capable of operating correctly, is likely to be disturbed by parasitic influences which trigger erroneous actions. Under the effect of a parasitic pulse which accidentally acts on the electronic circuits associated with the matrices, for example owing to the starting of an electric machine, or which results from the chattering of a relay, the configuration of the magnetic state of the matrices may be momentarily changed and this may result in erroneous triggering of the automatic control member in one direction or the other.

In accordance with the invention, the reliability of the items of information exploited is improved owing to a redundancy constituted by the twice-repeated observation of a state which has just changed. An "open" or "closed" state of a core is not considered as actually new and corresponding to a change of state of the corresponding relay unless it has been observed in the course of the two successive scrutinising cycles.

This method involves the use of two stores $M_1$ and $M_2$ attached to the "table."

The construction and operation of the apparatus by which this method is carried out will be described with reference to FIGURES 4, 5 and 6.

Figure 4:
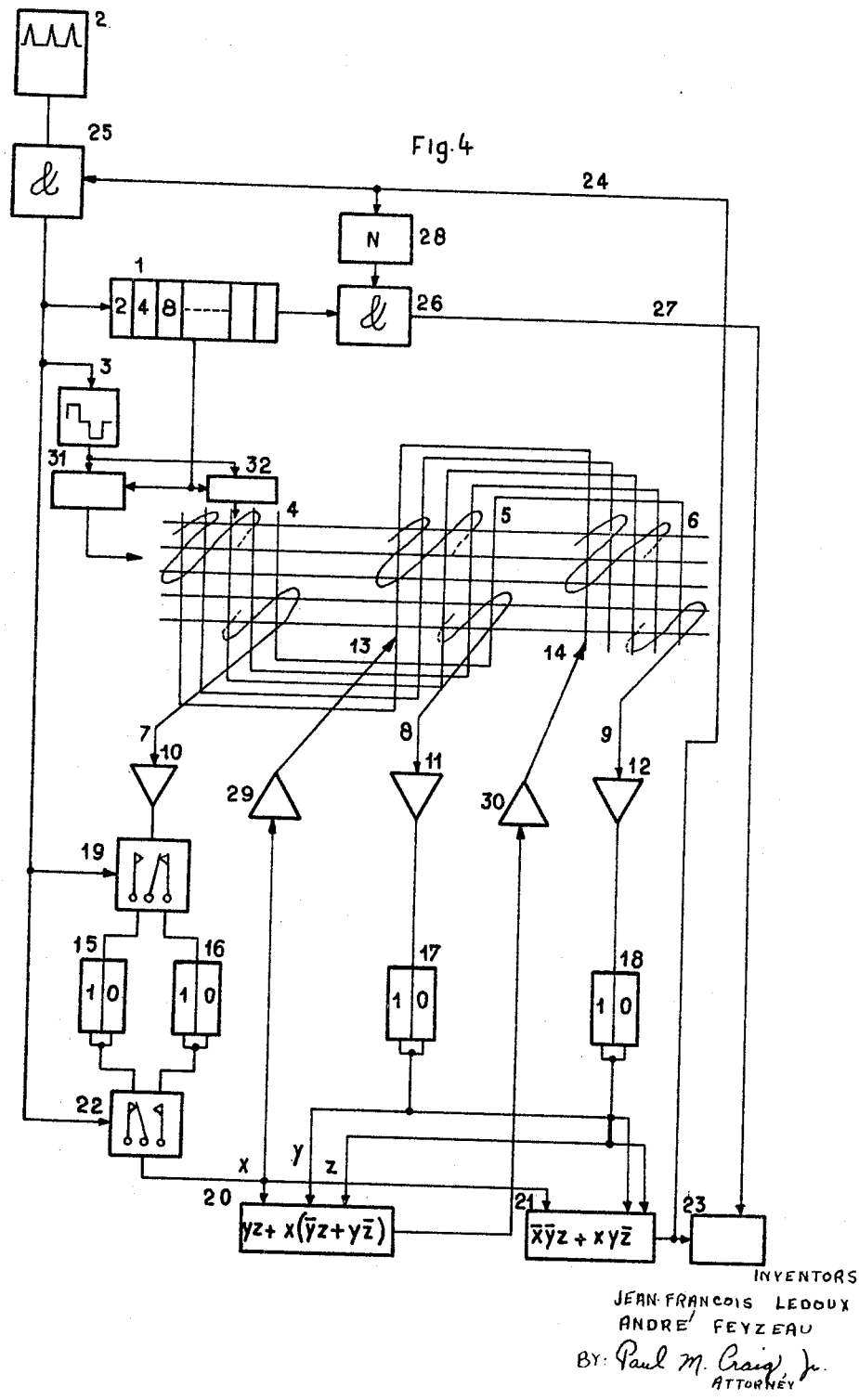

FIGURE 4 represents the general circuit diagram of the device according to the invention. FIGURE 5 illustrates an example of the operation of the device in the course of a number of successive scrutinising periods, and FIGURE 6 illustrates an example of operation in the course of a number of successive scrutinising cycles.

In FIGURE 4, there is denoted by 1 a pulse counter at which there arrives, through a gate 25 whose function will hereinafter be explained, clock pulses supplied by a generator 2. This counter, which is of the binary type, has been symbolically shown subdivided into its various binary levels.

The references 4, 5 and 6 denote the table R and the stores $M_1$ and $M_2$ respectively. In order not to overload the figure as a whole, the cores of the matrix 4 have been omitted, and consequently also the previously described windings S. A more detailed view of a portion of the matrix 4 is given in FIGURE 7 and a more detailed view of a portion of the matrices 5 and 6 is given in FIGURE 8. These three matrices are arranged in accordance with the same general principle: they comprise the same wires $x_i$ and the same wires $y_j$, their lines are in series with one another and their columns are in series with one another.

A member 31 utilising well known electronic devices applies two successive current pulses $+\frac{1}{2}$, $-\frac{1}{2}$, which are supplied by a generator 3, to the successive wires $x_1$, the rank of $x$ advancing by one unit at each pulse, that is to say, at each scrutinising period. Likewise, a member 32 applies the pulses $+\frac{1}{2}$, $-\frac{1}{2}$ to the same wire $y_j$ $2^m$ times in succession (for example, 32 times), and then selects the wire $y_{j+1}$, etc.

Each of the three matrices comprises a reading wire 7, 8, 9. Each of these wires is looped on a reading impedance (not shown). These wires are connected to the inputs of the three reading amplifiers 10, 11 and 12 respectively. The matrix 5 comprises an inhibitory wire 13 coming from an amplifier 29 and extending through all the cores of the matrix. Likewise, an inhibitory wire 14 coming from an amplifier 30 extends through all the cores of the matrix 6.

The device according to FIGURE 4 again comprises four bistable flip-flops 15, 16, 17, 18. The flip-flops 15 and 16 are associated with the reading amplifier 10, the flip-flop 17 is associated with the reading amplifier 11 and the flip-flop 18 is associated with the reading amplifier 12. The members 19 and 22, which are shown in the form of relay blades, are in practice electronic switches which change over at each clock pulse at the input and at the output of the bistable flip-flops 15 and 16, thus rendering operative for one scrutinising period the input of the flip-flop 15 and the output of the flip-flop 16, and vice versa at the succeeding period, with regular alternation.

The output of the flip-flops has been represented by an accolade embracing the two outputs to indicate that the quantity and its complement are used. In practice, there are two wires, but only one has been shown in order not to overload the figure.

The logical values of the output signals of the copying flip-flops 15, 16, 17 and 18 will be called $x$, $y$, $z$ respectively.

The logical quantity $x$ is applied to the input of the inhibitory amplifier 29, and to the input of the logical circuit 20. The logical quantities $x$, $y$ and $\bar{y}$, $z$ and $\bar{z}$ are applied to the input of the logical circuit 20. This logical circuit applies the signal $yz+x(\bar{y}+y\bar{z})$ to the input of the inhibitory amplifier 30.

The quantities $x$ and $\bar{x}$, and $y$ and $\bar{y}$, $z$ and $\bar{z}$ are applied to the input of the logical circuit 21, which supplies an output signal $\bar{x}yz+xy\bar{z}$, which is applied to the computer 23 in order to indicate to it either a closing of relays or an opening of relays. At the same time, this signal closes the gate 25, which stops the arrival of the clock pulses at the counter and prevents the state of the counter from changing. At the same time, the said signal, which is inverted in a circuit 28, opens the gate 26, which causes the address of the contact whose state has just changed to be written in the store of the computer 23.

Figure 7:
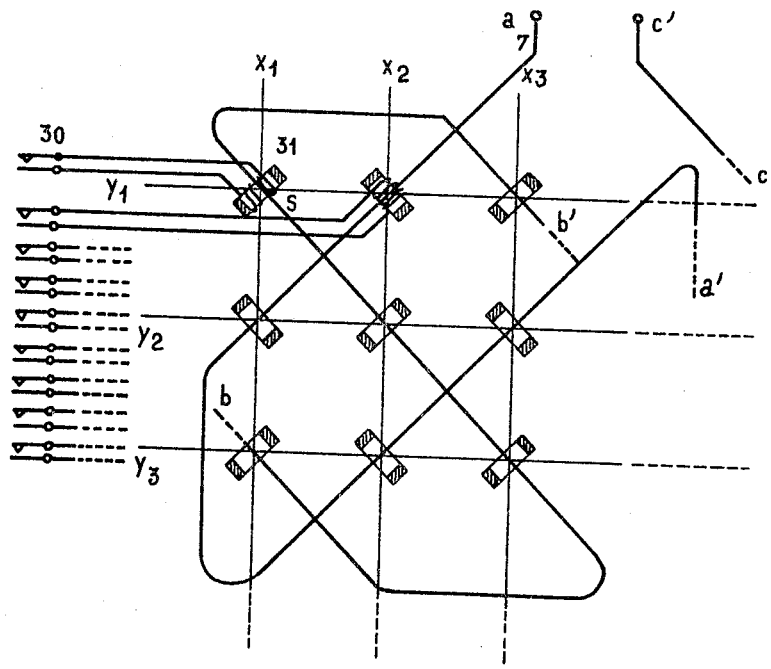

FIGURE 7 represents a portion of the matrix 4 of FIGURE 4. There are shown at 30 some of the relays whose state it is desired to check. Each of the cores such as 31 is traversed by one of the wires $x_1$, $x_2$, etc., by one of the wires $y_1$, $y_2$, etc., and by the reading wire 7 common to all the cores of the matrix, of which three portions $a$–$a'$, $b$–$b'$, $c$–$c'$ have been shown. Each of the cores 31 is connected by a winding S to the two points of a contact such as 30. In order not to overload the figure, the complete connections have been shown only in the case of the first two contacts and the first two cores.

Figure 8:
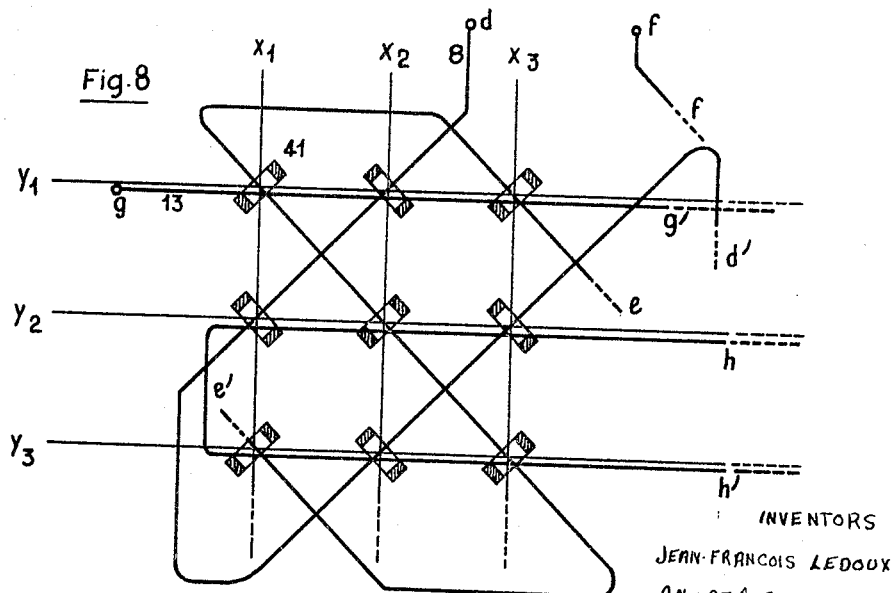

FIGURE 8 illustrates a portion of the matrices 5 and 6 of FIGURE 4. Each of the cores such as 41 is traversed by one of the wires $x_1$, $x_2$, etc., by one of the wires $y_1$, $y_2$, etc., and by a reading wire 8 common to all the cores, of which the portions d–d', e–e', f–f' have been shown, and by an inhibitory wire 13 common to all the cores, of which the portions g–g' and h–h' have been shown.

There will now be described the indications supplied by the table and the two stores, and the use made thereof in the various cases which may arise. It will be assumed that the existence of an open contact is conventionally translated by "1" and the existence of a closed contact by "0."

In the case of the permanent opening of the contact in the three matrices, there exist at the three copying flip-flops states which conventionally correspond to the notations:

1 1 1

If a closing occurs, it is first written in R. We then have 0 1 1

At the succeeding scrutinising cycle, the closing is confirmed. By a process which will hereinafter be explained, the 0 written at R is transferred into $M_1$ and a further 0 is written at R. We have:

0 0 1

It is this confirmed closing configuration which triggers the action of the computer.

For a permanently closed contact, we have the configuration:

0 0 0

At opening, we have:

1 0 0

At the succeeding scrutinising cycle, the configuration will have the form:

1 1 0

This confirmed opening configuration triggers the action of the computer.

For a permanently open contact, the following configuration is found:

1 1 1

It will be noted that, having regard to the process by which the combinations are formed, the same digits (0 or 1) normally exist either in the two left-hand positions or in the two right-hand positions:

0 0 – – 0 0   1 1 – – 1 1 the dash – replacing a 0 or a 1 as required. On the other hand, the combinations 1 0 1 or 0 1 0 can occur only as a result of a parasitic signal. The signal received at R is not confirmed, whether it be a question of an opening or of a closing. Since this parasitic signal is not confirmed in principle, it does not result in any erroneous triggering, as would be the case in a comparison system comprising only one store. The explanation of the operation of the automatic error-correcting device will be explained a little later.

The operation of the device will be explained in detail with reference to FIGURE 5, in which there have been illustrated the phenomena corresponding to a number of successive scrutinising periods and thus affecting the various cores of rank $n$, $n+1$, $n+2$, etc. It has arbitrarily been assumed that at the instant of their scrutiny the various cores are in the situations corresponding to the following table:

|  | $n$ open for a long time |  |  |
|---|---|---|---|
| $n+1$ 1st scrutiny after closing | $n+2$ 2d scrutiny after closing | $n+3$ 3d scrutiny after closing | $n+4$ 4th scrutiny after closing |
| $n+5$ 1st scrutiny after opening | $n+6$ 2d scrutiny after opening | $n+7$ 3d scrutiny after opening | $n+8$ 4th scrutiny after opening |

On the line "a" there have been shown the two pulses of opposite polarities which occur in each case at the reading impedance of the table matrix 4. The amplitudes conforming to the explanations given in the foregoing will be seen in the various cases.

At the time $t_2$ ($n$), the bistable flip-flop 15 records at 1. At the time $t_1$ ($n+1$), the store 5 marks 1 and the bistable flip-flop 17 records 1, the store 16 marks 1 and the bistable flip-flop 18 records 1. The reading of the members 15, 17 and 18 gives:

1 1 1

The logical circuit 20, which does not send any pulse into the inhibitory wires 13 and 14, causes 1 to be marked in 5 and 1 in 6 at the time $t_2$ ($n+1$).

At the time $t_2$ ($n+1$), the flip-flop 16 records 0. At the time $t_1$ ($n+2$), the reading of 16, 17, 18 gives:

0 1 1

Under these condtions, the logical circuit 20 causes 0 to be marked in 5 by inhibition at the wire 13, and causes 1 to be marked in 6. At the time $t_1$ ($n+3$), there is read:

0 0 1

Under these conditions, the logical circuit 20 triggers the action of the computer.

The law in accordance with which the logical circuit 20 and the logical circuit 21 operate is indicated in the following, in which $x$, $y$, $z$ denote respectively the logical values of the output signals of the various copying flip-flops:

| 15 16 | 17 | 18 | Reading | Writing | | Computer |
|---|---|---|---|---|---|---|
| $x$ | $y$ | $z$ |  | 5 | 6 |  |
| 0 | 0 | 0 | Closed for a line time | 0 | 0 | Closure demand. |
| 0 | 0 | 1 | Detection of closure | 0 | 0 |  |
| 0 | 1 | 0 | Fault (a) | 0 | 0 |  |
| 0 | 1 | 1 | Occurrence of closure | 0 | 1 |  |
| 1 | 0 | 0 | Occurrence of opening | 1 | 0 |  |
| 1 | 0 | 1 | Fault (b) | 1 | 1 | Opening demand. |
| 1 | 1 | 0 | Detection of opening | 1 | 1 |  |
| 1 | 1 | 1 | Open for a long time | 1 | 1 |  |

It will be seen that after the state marked "fault (a)" (0 1 0), the logical circuit 20 produces the configuration (0 0 0), and that after the state marked "fault (b)" (1 0 1) it produces the configuration (1 1 1). In the case of an isolated parasitic influence, the device ensures automatic cancellation of erroneous entries.

Figure 5:
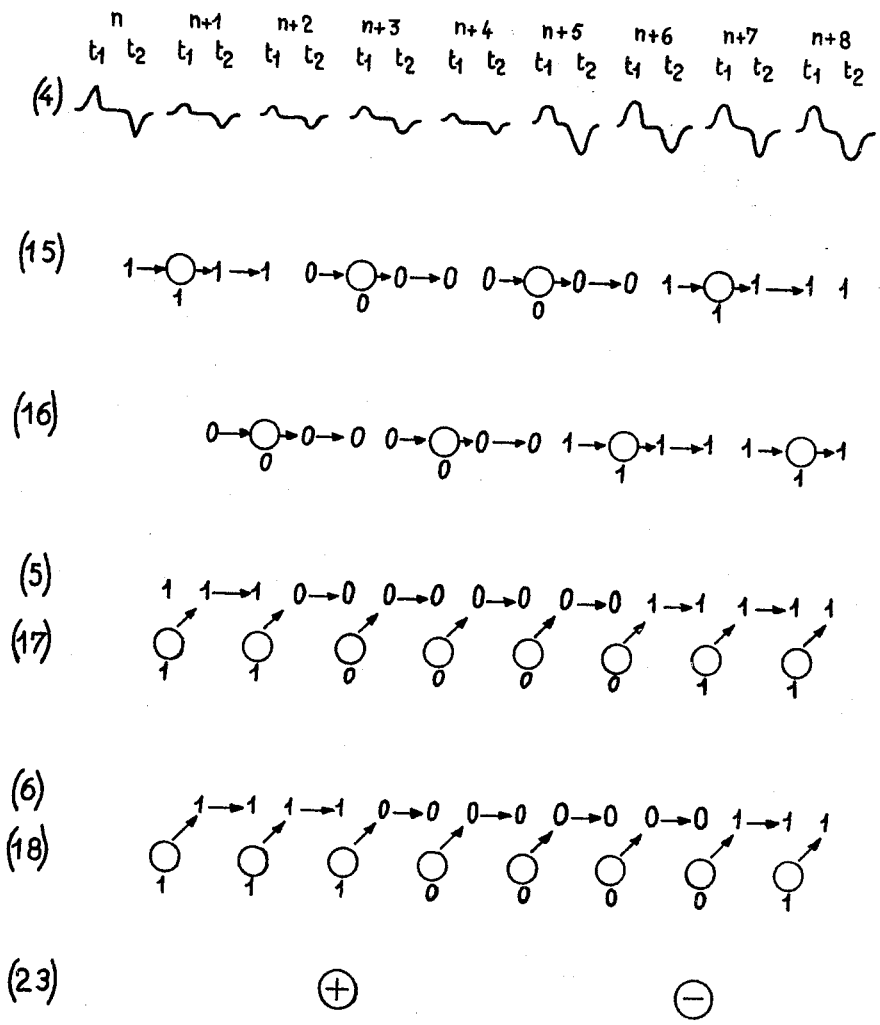

It will also be seen from FIGURE 5 that the flip-flop 15 records at the time $t_2$ ($i$). Its indication is exploited at the time $t_1$ ($i+1$). It is impossible under these conditions to use it again in reading at the time $t_2$ ($i+1$), since the interval of time between the end of the pulse $V_1$ and beginning of the pulse $V_2$ is of the order of one microsecond. It is only at the time $t_2$ ($i+2$) that the same flip-flop will be able to effect a further reading. This is why two flip-flops have have been associated with the reading amplifier 10, one flip-flop for the even times and one flip-flop for the odd times. This necessity is imposed by the fact that the pulse $V_2$ of the core table 4 is exploited, and not the pulse $V_1$.

It will be seen that the reading of the table 4 which takes place at the time $n$ at the core of rank $n$ is combined with the reading which takes place at the cores of rank $n+1$ of the stores 5 and 6.

For the other scrutinising periods mentioned in FIGURE 5, the operation of the device will readily be understood in the light of the foregoing explanations.

In FIGURE 5, the digits surrounded by a circle, which appear at the time $t_1$, constitute the readings which motivate the logical decisions:

↗ indicates a logical decision supplied by the logical circuit 20;
→ indicates a maintenance of state;
(+) indicates a closure demand;
(−) indicates an opening demand, these demands addressed to the computer being supplied by the logical circuit 21.

In FIGURE 6 there have been shown the states of the same elements as in FIGURE 5, in conjunction with the change coresponding to one and the same core, from scrutinising cycle to scrutinising cycle, between an instant when the contact has long been open and the first cycles which follow the closing of the contact. The symbols have the same meaning as in FIGURE 5. The "closed contact" symbol which appears between the time $\tau$ and the time T, indicates indicates that the contact closes at the corresponding time on the time scale.

Only the response of the core of rank $n$ to the scrutinising current has been shown. The state of the rank $n$ is recorded in the core of rank $n+1$, and the history of the contact of rank $n+1$, which would be written in the core of rank $n+2$, has been disregarded.

It will be seen that the time which elapses between the closing of the contact and the instant when it opens is signalled to the computer $a$ for the maximum limit 2T. Of course, the same would be the case with the closing. This shift, which affects all the readings, has no effect on the resolving power of the apparatus, which is equal to T. Two events separated by a duration equal to or greater than T are indicated in their true order of succession, and the corresponding logical decisions may be notified to the computer. On the other hand, two events separated by an interval of time shorter than T might be indicated as simultaneous. In one embodiment of the invention, the interval T therefore had the valve of 60 milliseconds for the observation of 3000 contacts with a scrutinising period of 20 microseconds.

We claim:
1. Device for triggering one of two electric signals when a contact forming part of an assembly comprising a large number of contacts closes or opens, and having means for performing a recurrent scrutiny by means of coincident current pulses applied to a matrix of toroidal magnetic cores having a rectangular hysteresis loop, two pulses of opposite polarities being applied successively to the same core in the course of one scrutiny, and the ordinal numbers of the pulses being indicated by a counter, said device including three core matrices, of which the vertical and horizontal wires are respectively in series between the three matrices, each core of the first matrix comprising a winding whose ends are connected to the two points of a contact to be checked, two binary flip-flops associated with the cores of odd and even rank, respectively, of the first matrix in order to copy the state of the said cores at the second scrutinising time, a third and a fourth binary flip-flop for copying, respectively, the state of the cores of the second and third matrices, means for utilising the state of each flip-flop during the first succeeding scrutinising time, in combination with the states of two cores of the other two matrices, respectively, and for transferring the state of the position core $(n-1)$ from the first matrix to a position core $n$ in the second and third matrices, the state of the pulse counter supplying the reference number "$n$" of a contact which is in fact situated at the position $(n-1)$, a first logical circuit governing the registration in the second and third matrices, at the second scrutinising time, as a function of the state of the three copying binary flip-flops of the matrices at the first scrutinising time, a second logical circuit emitting a signal if the state of the copying flip-flops at the first scrutinising time corresponds to the confirmed closing notation, i.e. 0 0 1, and another signal if the said state corresponds to the confirmed opening notation, i.e. 1 1 0, the signal emitted by the second logical circuit preventing the state of the counter from changing and producing the writing of the indicated number in the store of the computer.

2. A device according to claim 1, including means such that, if the occurrence of an isolated parasitic influence brings about the configuration (1 0 1) during the scrutiny of an open contact, this configuration is not maintained and the succeeding scrutiny returns to the configuration (1 1 1), while if a parasitic influence produces the configuration (0 1 0) in the case of the scrutiny of a closed contact the succeeding scrutiny returns to the configuration (0 0 0).

No references cited.

NEIL C. READ, *Primary Examiner.*
H. I. PITTS, *Assistant Examiner.*